United States Patent [19]
Dunlap et al.

[11] 3,791,395
[45] Feb. 12, 1974

[54] RESTARTING FLOW OF GELLED OIL

[75] Inventors: Henry F. Dunlap; Ralph E. Styring, Jr., both of Dallas, Tex.

[73] Assignee: Atlantic Richfield Company, New York, N.Y.

[22] Filed: Dec. 15, 1972

[21] Appl. No.: 315,687

[52] U.S. Cl. .................................................. 137/13
[51] Int. Cl. ............................................... F17d 1/10
[58] Field of Search .................... 137/1, 2, 8, 13, 15

[56] References Cited
UNITED STATES PATENTS
2,958,333  11/1960  Poettmann .............................. 137/8

Primary Examiner—Alan Cohan

[57] ABSTRACT

The startup yield pressure of a segment of standing oil which has cooled below its pour point is reduced by applying reoccurring pressure pulses or cycles to the gelled oil at a pressure such that portions of the gelled oil are progressively shear degraded. The pressure pulses are continued until the flow resistance of the gelled oil has been degraded enough to enable renewal of oil flow at a higher continuous startup pump flow rate for a given pressure than could otherwise be obtained.

20 Claims, No Drawings

RESTARTING FLOW OF GELLED OIL

BACKGROUND OF THE INVENTION

This invention relates to a method for decreasing the startup yield pressure of a segment of gelled oil in a pipeline and for renewing oil flow in the pipeline.

In cold regions where for long periods the prevailing ambient temperature is cold enough to cool static oil to a temperature approaching or below its pour point, cessation of oil flow through an oil gathering line, or feeder line, or trunk line will cause stationary oil in the pipeline to cool and gel. This gives rise to the problem of restarting oil flow when the pipeline is shut down for a period long enough for the oil to gel. This problem is encountered in the pipelining of crude oils in cold climates like the Arctic regions and in the pipelining of certain fuels or synthetic high pour point oils. When oil flow through a gelled section of a pipeline is to be renewed, the yield pressure of the section of gelled oil may be such that it would require an undesirably high pressure to start or restore the flow of liquid oil through the pipeline. The renewal startup pressure should not exceed the design pressure of the pipeline, the pumping stations, and related equipment. The desired renewal startup pressure for a system varies with the size of the line and the design conditions as well as various operating limitations, safety valves and equipment installed with the line.

Pipelines are laid up and down slopes, valleys, river beds, and mountains. This results in elevation differences between sections of the pipeline and oil hydrostatic head pressures. When oil flow through the pipeline is to be renewed, these hydrostatic pressures can severely limit the amount of additional pressure that can be applied to the pipeline.

Normally, when oil flow through a pipeline is to be renewed, oil is pumped into the pipeline until the yield pressure of the gelled oil or a maximum design pressure for the system is reached. Under certain conditions initial pump injection rates will be low and it may take long periods of time to restore the desired oil flow rate. Yet, there is a minimum flow rate compatible with the installed pumps that must be maintained. Otherwise, the pump temperature starts to rise rapidly burning out seals and bearings and the like unless the pump is shut downby temperature safety devices. There is also a maximum allowed time for restoring and bringing oil flow back up to the desired level. Down time is costly and creates collateral problems.

SUMMARY OF THE INVENTION

When the ambient temperature is cold enough to gel standing oil and a section of a pipeline is temporarily shut down long enough for the oil to gel, the yield strength of a section of the gelled oil is progressively shear degraded by pressure reversals or pulses thereby decreasing the startup yield pressure required to renew oil flow through the section and permitting restoration of oil flow at a continuous flow rate more compatible with the pipeline pumps and design than would otherwise be obtained in the absence of applying the pressure pulses.

The pipeline is expansible and the gelled oil is moderately compressible. During the pressure rise portion of a pulse cycle, the rise in pressure gradient creates a transient pressure wave traveling away from the pulse source which expands the pipeline and compresses and yields an increment of the gelled oil thereby shear degrading its flow resistance or yield strength.

During the pressure decline portion of the pulse cycle, a reverse pressure gradient travels backward toward the pulse source causing further degradation of the gel. When another pressure pulse is applied, previously partially degraded gel is progressively degraded further and usually the pressure gradient or transient pressure wave travels further away from the source. At normal pulse rates, the distance of travel is extended because the flow resistance and wave attenuation characteristics of the intervening gel have been decreased. Extension of the distance of travel of a given pressure gradient or level causes additional increment or increments to yield and be shear degraded. If additional pressure pulses are applied, previously partially degraded increments are usually degraded further and additional increments are usually progressively yielded. The pressure pulses are repeated until the desired reduction in yield pressure of a section of gelled oil is reached. Thereafter, oil flow through the treated section may be renewed at a higher minimum continuous pump flow rate for a given pump pressure than could be obtained in the absence of applying the pressure pulses. The pressure pulses may be applied at several points to degrade several gelled oil sections within one long segment or several spaced apart sections of the pipeline. The pressure pulses may be applied in a section of the pipeline wherein oil hydrostatic head pressures limit the amount of additional pressure that may be applied to the pipeline during startup.

DETAILED DESCRIPTION OF THE INVENTION

Oil flowing in a pipeline at normal temperatures behaves as a Newtonian fluid with relatively low flow resistance. A pressure gradient applied to liquid oil is quickly transmitted through the oil. But, in a region where the ambient temperature is cold enough to cool standing oil to its pour point temperature and below, standing or quiescent oil gels into a thick material with relatively high flow resistance and through which substantial pressure gradients are relatively slow to travel. This invention is primarily concerned with the flow resistance of gelled oil at the time that oil flow is to be renewed. This startup flow resistance is dependent on the yield stress or strength of the gelled oil and other factors to be hereinafter set forth.

Normally, when oil flow in a long pipeline is ceased, one long segment or a number of long segments of quiescent or static oil are left standing in the pipeline. As a section of standing oil cools, the oil shrinks. This shrinkage may lead to unfilled spaces or to gaps in the gelled oil or to a widening of the gaps between segments or sections of standing oil. Oil hydrostatic head pressure resulting from elevation changes in the pipeline and exerted on a section of gelling oil will tend to compensate for the effects of oil shrinkage within a gelling section by keeping the gelled section full.

The gel tends to form in two ways largely depending on the rate of cooling and the composition of the oil. The rate of cooling depends on a number of conditions especially the diameter of the pipeline and whether or not the line is buried or insulated. Rapid cooling tends to cause inward gelling of the oil. In other words, as the outer edge of the oil cools, components gel on the extremities of the pipe and the gel continues to form inward toward the center of the pipeline. In larger lines, this could result in the center of the gelled oil exhibiting less yield strength, but in large lines, the rate of cooling is slow and this hard inward gelling phenomenon is not as pronounced. The way that the gel forms and certain other conditions affect the manner in which the gel commences to flow upon startup and is of some interest to the method of this invention which will hereinafter be shown.

The method of this invention applies cycles of a rise in fluid pressure and a decline in fluid pressure at the point of application to degrade the flow resistance of a section of gelled oil shortly before renewing oil flow through the section. These pressure cycles are sometimes herein referred to as pressure pulses and, as used herein, the pressure rise and decline must be larger than the normal pressure vibrations created by the pump used on the pipeline and must be at a lower frequency than this normal pump pressure noise.

More specifically, in the method of this invention, a first pressure pulse is applied at a location in a section of a pipeline to gelled oil within the section. This first pressure pulse may be applied by injecting fluid at a location into a section of the pipeline while monitoring the injection flow rate until a first pipeline volume of fluid has been injected and a suitable resulting pressure has been reached. Injection is then ceased and at least a portion of the suitable pressure is released by backflowing fluid in the section toward the location. A convenient way of deciding when to cease injection of fluid is to continue injection until the injection flow rate at a suitable pressure substantially declines to an appropriate low rate. During the pressure rise portion of this first pressure cycle or pulse, a peak or top pressure level and pipeline volume of fluid injected is reached. This peak pressure level and fluid volume is sufficient to shear degrade a part of the thixotropic gelled oil. When the gel strength of a thixotropic substance is shear degraded, its flow resistance is degraded and, as previously indicated, the degraded increment will transmit pressure gradients further than before degradation. A detailed explanation of what happens during the pressure rise portion of this first pulse is useful to an understanding of this invention and how it provides the desired results. The explanation of what happens during the first pressure rise is also of particular interest since this first pressure rise is similar to the pressure rise that occurs when pumps are restarted in a normal pipeline operation.

A brief review of several concepts will aid an explanation of what happens during the first pressure rise and a later description of what happens during the pressure decline portion of the first pressure cycle and during subsequent cycles. For logical reasons based on yield experiments with gelled oil, it will be assumed that initially most of the shear phenomena occur near the wall of the pipeline. For example, it has previously been pointed out that the way that the gel forms and its final gel strength affects the manner in which the gel starts to flow. Experimentation with gelled oil shows that initial flow of a gel will lie somewhere between piston-like flow and half Newtonian flow. A knowledge of the precise manner of flow is not needed. What is needed is a realization that initially the velocity gradient is greatest near the outer edge of the pipeline and that there is almost no velocity gradient near the center of the pipeline. Where there is no velocity gradient, there is no shear degradation; therefore, initial yielding of an increment of gelled oil usually only degrades a part of the incremental portion, that is, usually the part nearest the outer wall of the pipeline. Shear rate degradation of the gel rapidly and significantly degrades or reduces the flow resistance or yield strength of the degraded gel. This, in turn, causes several effects which will hereinafter be explained. The rate of shear degradation or the rate of degradation of flow resistance depends on the rheological properties and characteristics of the gel and on the rate or amount of displacement of the degraded part of the gel. It has been found that the rate of shear degradation is initially high and thereafter tends to level off to a gradual rate of change. Any yielding or displacement is, therefore, significant.

The main shear concepts or factors involved are shear stress, shear rate, and shear strain, particularly and initially at the walls of the pipeline for reasons previously indicated and because of the expansibility of the pipeline. For purposes of this invention, it is useful to note that wall shear stress, which is closely related to apparent yield strength, at a point in the pipeline is a function of the internal pipe diameter and the pressure gradient along the pipeline at that point. The method of this invention uses reversing pressure gradients or shear stresses created by pressure cycles or pulses as hereinafter shown. It is also useful to note that the wall shear stress at a moment of time is a function of the shear rate at that point and moment, and the shear rate depends in part on the total flow rate at the given point. The wall shear strain at a point and time also depends on the volume of fluid flowed past a point. In the method of this invention, each reversing pressure cycle increases the total flow rate through an increment of the pipeline and the wall shear rate, and also increases the total volume flowed past a point and the wall shear strain. As mentioned previously, the net effect of the reversing pressure cycles is to shear degrade the flow resistance of the gelled oil in a section of oil.

Compressibility of the gelled fluid contained in a section of a pipeline and expansibility of the pipeline play a major role in the performance of this invention and the resulting shear effects and the net effect just mentioned. The expansibility of the pipeline depends on the internal diameter, Poisson's ratio for the pipe wall, the wall thickness, and the modulus of elasticity. Some of these variables in turn depend on the composition of the pipe material. The effect of expansibility frequently gives an effect equivalent to and greater than the compressibility of the gelled fluids contained in the pipeline. For example, in one series of tests the expansibility of an 8 inch aluminum line and a 24 inch standard wall steel line gave an effect approximately equivalent to the compressibility of the gelled fluids.

Due to compressibility of the gelled oil and expansibility of the pipeline itself, during the first pressure rise, fluid may be injected at a location in the pipeline to apply fluid pressure against a section of gelled oil without causing gelled fluid to flow out of the section. As fluid is injected, a pressure gradient between the location and more remote increments of the section occurs. The magnitude of this pressure gradient at the location is time dependent and depends on the maximum or peak injection pressure level desired, the compressibility and expansibility of the system and fluids, the characteristics of the gel, the internal pipeline diameter, the rate of fluid injection, and other like factors. These factors also affect the frequency at which it is practical to apply pressure pulses. Fortunately, as will hereinafter be pointed out, a very wide range of frequencies is satisfactory because it takes a relatively long time for a degraded gal to rebuild its gel strength.

As fluid continues to be injected, the pressure rises and parts of the gelled fluid starting at the location are shear degraded due to the thixotropic nature of the gel. Pressure is transmitted through the partially yielded gel to maintain the pressure gradient at the interface between the partially yielded and unyielded gel. The pressure gradient attenuation characteristics of the partially yielded gel is substantially less than before yielding. The unyielded gel starts to yield when the pressure gradient is sufficiently high. This pressure rising and gel yielding continues away from the location as the pressure wave is transmitted to increments of the gelled oil. The rate of pressure wave or gradient propagation depends on the aforementioned factors especially the gel strength or flow resistance of the oil. The higher the gel strength, the greater the pressure gradient needed to yield the gel, the slower the rate of pressure gradient propagation, and the greater the rate of attenuation of the pressure gradient. The higher the ratio of the applied pressure to the gel strength, the faster the rate of pressure gradient or wave propagation. Degrading the flow resistance thereby increases the rate at which the pressure gradient propagates and reduces the rate of attenuation of the pressure gradient.

Eventually, if fluid is injected at a reasonable rate, the injection pressure approaches and reaches the maximum injection pressure, the rate of fluid injection rapidly declines. At this time, the rate of shear degradation of previously yielded increments of gelled oil and of previously unyielded increments declines because the pressure gradient across increments, shear stress, decreases and because the flow rate and rate of increase in total volume of flow through an increment, shear rate and shear strain, decrease. The rate of flow into the location will continue to decline and cannot increase any sooner than it takes for the pressure wave to travel the entire length of the section of gelled oil and the gelled oil starts to flow from the section. In a normal pipeline startup operation, as previously mentioned, this may take an undesirably long period of time and cause undesirably low continuous pump flow rates. As used herein, the continuous pump flow rate is the lowest flow rate that would normally be encountered at a given startup pump pressure. As pointed out when a given pump pressure is reached, the flow rate declines until the section of gelled oil yields.

The situation just described applies to a normal startup operation and to the pressure rise portion of the first pressure cycle of this invention. It should be noted that until the entire gelled section yields, the total amount of shear degradation and total fluid volume passing through increments of the gelled oil declines as the distance from the location increases. The rate of pressure gradient attenuation along the gelled section is relatively high. Nevertheless, the flow resistance of a part, for example the part near the wall of the pipeline, of at least a first incremental portion of the gelled oil has been degraded to some extent and the ability of this degraded portion to transmit subsequent pressure gradients at higher rates or with less attenuation is enhanced.

In the renewal startup method of this invention, at least a portion of the peak pressure reached during the pressure rise portion of a pressure pulse is released creating the pressure decline portion of the first pressure cycle or pulse. The pressure decline part of the cycle can be much faster than the pressure rise portion. When the pressure at the location is decreased, a reverse pressure gradient or wave travels through the previously degraded gal and fluid in the section backflows toward the location. The reverse pressure wave creates new shear stresses, shear rates, and shear strains which further degrade the flow resistance of the previously partially degraded parts of the first incremental portion. It is also possible that some of the previously unyielded gel is degraded because the reverse flow resistance is less than the forward flow resistance. As before, the shear stress, shear rate, and shear strain differ for each increment with the greatest effects taking place nearest the location. In other words, the total volume flowed through an increment is increased by the reverse flow. The ratio of the pressure gradient to the degraded yield strength of an increment is greater than during the pressure rise portion of the cycle thereby increasing flow rate or shear rate. The net effect of the pressure reversal is, therefore, to further degrade the flow resistance of the parts of the incremental portion partially degraded during the pressure rise part of the pressure cycle.

During the pressure decline portion of a pressure cycle, it is not necessary to release all of the pressure. The amount of pressure left on the section at the location may be due to oil hydrostatic head pressures caused by elevation differences, or may be due to simply not releasing all of the pressure built up during the first pressure rise portion of the first cycle, or may be due to a combination of both causes. Maintenance of a suitable pressure on the location throughout the time of application of other subsequent pulses decreases the volume of fluid that must be injected during the pressure rise portions of subsequent pressure cycles to reach given peak pressures. The pressure level to be maintained depends on factors similar to the factors affecting performance of the method of this invention. Generally, it is desirable to maintain a pressure during subsequent cycles that is at least one-fourth as great as the largest pressure rise occurring during subsequent pressure cycles.

After release of a certain amount of pressure during the first cycle, a second pressure pulse or cycle is applied at the location. This second pressure pulse is applied before the shear previously degraded portion of the gelled oil has had time to rebuild its original flow resistance. Experiments on gelled oil have shown that it takes a relatively long time for a degraded gel to rebuild its gel strength. The pressure rise portion may be created by reinjecting fluid at the location while monitoring the injection flow rate until a second volume of fluid has been injected and a suitable resulting pressure level has been reached. Injection is then ceased. As before, a convenient way of deciding when to cease injection of fluid at the location is to continue injection until the injection flow rate at a suitable pressure substantially declines to an appropriate rate. As occurred during the first pulse, a suitable peak or top pressure level and volume of fluid injected is reached during the pressure rise portion of the second pressure cycle. The time that it takes to create this peak pressure is long enough and the peak pressure is high enough to further degrade the flow resistance of the gelled oil. Usually, the length of the degraded galled oil is increased and at least part of a second incremental portion of the gelled oil in the section is degraded. The extended portion or second incremental portion is degraded in the same way that the first incremental portion was degraded. The second incremental portion will be contiguous to the first incremental portion and is further from the location than the first degraded portion. Usually, the pressure wave or gradient travels further away from the source and is extended primarily because the flow resistance of the gelled oil was degraded during the first cycle and because the second pressure rise creates new shear effects and further degrades the previously degraded gelled oil or first incremental portion. As previously indicated, the pressure wave travels faster through degraded gal and is less attenuated by degraded gel. The total flow volume flowing past a point in the pipe is increased. The ratio of the pressure gradient to the further degraded yield strength of an increment is higher than during the first cycle. The net effect of the pressure rise portion of the second pulse is, therefore, to create new shear stresses, shear rates, and shear strains which further degrade the flow resistance of the previously degraded gelled oil and which usually travel further down the pipeline from the injection point or location and thereby reach further into the gelled oil section to degrade a second incremental portion of the gelled oil.

If at the instant that fluid injection is commenced, the pressures in the pipeline at the location were the same for both the first and the second pressure cycle, the volume or amount of fluid injected during the pressure rise portion of the second cycle would normally be greater than the volume of fluid injected during the pressure rise portion of the first pressure cycle because as a general rule the pressure wave travels further away from the location during the second cycle. The volume of fluid is measured at pipeline conditions of pressure and temperature and for simplicity is herein referred to as the pipeline volume. Sometimes, however, the initial pressure in the pipeline at the location is lower than a pressure maintained during the second and subsequent pressure cycles and more volume of injection may be injected during the first pulse cycle.

During the second pulse, after flow into the section is ceased, at least a portion of the suitable pressure peak is released creating the pressure decline portion of the second pressure cycle or pulse. A reverse pressure gradient or wave travels back through the previously degraded portions and fluid in the section backflows toward the location. This reverse pressure wave creates new shear stresses, shear rates, and shear strains which further degrade the flow resistance of previously degraded gelled oil, that is, the oil in the first and second incremental portions.

The aforementioned steps are repeated by applying subsequent pressure pulses at the location before the previously degraded gelled oil rebuilds its original resistance or by cycles of fluid injection and pressure release at the location. The pressure rise time or duration and the peak or suitable pressure levels reached during the pressure rise portion of subsequent pressure pulses or cycles will be such that the flow resistance of the gelled oil is progressively shear degraded. As previously described, usually additional incremental portions of gelled oil will be degraded as well as further degradation of the previously degraded gel. Each additional incremental degraded portion is progressively further from the location or injection point than the next preceding degraded incremental portion. Also, if the peak pressures are equal or increasing, the pipeline volume of fluid injected in the subsequent cycles is usually greater than the pipeline volume of fluid injected during the second cycle and the next preceding cycle because the pressure wave created during each cycle travels further away from the location. These subsequent pressure cycles or pulses are continued until oil flow through the section may be renewed at a continuous startup pump flow rate for a given pressure substantially larger than the normal continuous startup pump flow rate that would be maintained at the same pressure if the oil flow were renewed by simply restarting the pump. As previously described, once a given pressure is reached in the absence of the pressure pulse technique, the pump flow rate normally declines and stays low until the entire gelled section yields. In this invention no specific startup flow rate is established, but the method of this invention will allow a higher minimum flow rate at a given pressure because the total flow resistance of a section of gelled oil is decreased. Therefore, after the flow resistance of a sufficient amount of the gelled oil in a section, or in several sections of a long segment, or in several spaced apart sections, has been degraded, liquid oil through the section or sections of the pipeline is renewed before the shear degraded gelled oil rebuilds its original flow resistance. Renewal of flow may be commenced by simply renewing pumping. As a practical matter, the process of this invention best applies to sections of gelled oil that are at least 5 miles long and longer.

Experimental tests on gelled oils indicate that decreases in flow resistance or yield pressure on the order of 40 percent and greater can be achieved by degrading the gel. The extent to which the gel structure and flow resistance of the section of gelled oil is degraded will, of course, be a function of the many factors previously mentioned, the frequency of the pressure pulses or cycles, and the gel properties. High frequencies cause lots of reversals but the attenuation is high and the distance of travel will be low. At lower frequencies the attenuation is less and the distance of travel greater, but the reversals or cyclic working of the gel structure is less per unit of time. As a practical matter, the pipeline system itself and the concepts just described will set the frequency rate.

The flow resistance and gel properties of a section of gelled oil are primarily affected by the following factors. Crude oils are usually a complex mixture of oils, waxes, asphalts, bitumens, and resins with a wide range of melting points, cloud points, or pour points. Some of the effects observed when investigating the factors influencing the gel strength and yield pressure of an oil are complex and not fully understood. Concepts or explanations have been proposed which explain at least in part what has been observed and it has been fully demonstrated that the yield pressure of an oil developed during period of quiescence vary widely with the composition of the oil, the temperature, the thermal history of the oil, the rate of cooling, the previous shear history of the oil, aging of the oil, and the compressibility of the system.

The effects of asphalt, waxes, and the like components on the pour point of oil is well known. In addition, the gel strength of an oil is sensitive to the presence or absence of light ends. Weathering, flashing, or removal of light ends leads to a significant increase in gel strength. Moreover, flashing of live crude oil from a producing well to atmospheric pressure in one step leads to a higher yield strength than multi-step flashing. Of course, the presence of large percentages of water would affect yield, but water is usually separated from the oil before the oil is passed through the pipeline. The mixing of even a small quantity of high yield strength oil tends to lead to a mixture having the yield strength like the high yield strength oil.

In general, decreasing the gel temperature and increasing the rate of cooling increase the yield strength and in turn cause a higher yield pressure.

As to shear history, it has been found that subjecting the oil to high shear conditions tends to increase the yield strength of the gelled oil after it is subsequently cooled to a low temperature. The observed affect of shear depends in part on the temperature of the oil during the time of shear application. The temperature in turn is affected by the composition of the oil.

Aging and thermal history are in some respects alike. As used herein, however, aging relates to time at a given temperature. In general, for a period of time the gel strength of a gel increases. Results indicate that the gel strength begins to stabilize in about eight to ten hours of residence time.

The thermal history of an oil primarily relates to cycles in temperature with the peaks in high and low temperatures encountered being important. Generally, if an oil is returned to a high temperature and held at that temperature for a period of time, the effects of prior thermal history are for practical purposes erased. The temperature to which the oil must be raised depends on the composition of the oil. If the temperature of the oil is cycled in a manner such that the oil never reaches the restoration temperature, cycling tends to cause an increase in yield pressure when the oil is subsequently cooled and gelled. The effects of cycling on yield pressure depend in part on the temperature to which the oil is raised during a cycle. The effects of a peak temperature during a cycle depend on the composition of the oil. In general, for normal crude oil, it has been found that cycling of the crude oil at a temperature below 40°F. increases the ultimate yield pressure of the oil when the oil is cooled and gelled. The mechanism by which the yield increase occurs can be explained in the following manner. The asphalt micelles and paraffin crystals form simultaneously when the oil is cooled. If the oil is cooled to a temperature above its gel point or pour point, the cooled oil has no structure and consequently very little gel strength. Upon reheating of the cooled oil, the paraffin tends to go back into solution while the asphalt micelles are not significantly affected unless the temperature is raised significantly. When the temperature is again lowered, the paraffin crystals reform but this time they form within and around the asphalt micelles. This results in a paraffin-asphalt gel structure of considerable strength at low temperatures; consequently, the ultimate yield pressure of a gelled oil which has been subjected to this type of cycling is quite high.

Equations have been developed and published which for purposes of this invention adequately predict yield behavior of gelled, thixotropic oils in pipelines. In general, the shear strength of a certain oil at a certain temperature is approximately a point function of shear rate and shear strain. The relationships involved have been verified experimentally by first returning the oil to its original condition. This is best accomplished by reconstitution of the oil, if desired, and by reheating the oil to some temperature level, for example, the reservoir temperature or some other preceding high process temperature. This temperature level is held for a period of time to overcome the effects of prior yield affecting factors. Thereafter, subsequent factors like rate of cooling, shearing, mixing, temperature cycling, and the like, which measurably influence yield strength, can be controlled and varied or simulated to develop the desired correlations.

The foregoing describes preferred embodiments of the invention. Reasonable variations and modifications are practical within the scope of this disclosure without departing from the spirit and scope of the claims of this invention.

The embodiments of the invention in which an exclusive property or privilege is claimed are defined as follows:

1. A method for renewing oil flow through a section of a pipeline in which oil flow has been temporarily shut off and in which quiescent oil has gelled, which method comprises applying a first pressure pulse at a location in said pipeline to gelled oil in said section, said first pressure pulse being at a peak pressure level such that part of said gelled oil is shear degraded thereby decreasing the flow resistance of said gelled oil, applying a second pressure pulse at said location before the previously degraded gelled oil rebuilds its original flow resistance, said second pressure pulse being at a peak pressure level and duration such that part of said gelled oil is shear degraded thereby further decreasing the flow resistance of said gelled oil, applying subsequent pressure pulses at said location before the previously degraded gelled oil rebuilds its original flow resistance at peak pressure levels and durations such that the flow resistance of said gelled oil is progressively shear degraded until enough of the gelled oil in said section has been degraded to enable renewal of oil flow through said section at a continuous startup pump flow rate for a given pressure substantially larger than the normal continuous startup pump flow rate at said pressure, and renewing liquid oil flow through said section of said pipeline before the shear degraded gelled oil rebuilds its original flow resistance.

2. The method of claim 1 wherein said section of said pipeline is at least 5 miles long.

3. The method of claim 1 wherein a pressure at least one-fourth as great as the largest pressure rise occurring during application of the second and subsequent pressure pulses is maintained at said location throughout the time of application of said second and subsequent pressure pulses.

4. The method of claim 3 wherein said section of said pipeline is at least 5 miles long.

5. The method of claim 1 wherein during the first pressure pulse the flow resistance of a first incremental portion of the gelled oil in said section is degraded, and during the second pressure pulse the flow resistance of a second incremental portion of the gelled oil is degraded, said second incremental portion being further from said location than said first incremental portion, and during each of the subsequent pressure pulses the flow resistance of an additional incremental portion of the gelled oil is degraded, each of said additional incremental portions being progressively further from said location than the previously degraded incremental portions.

6. The method of claim 5 wherein said section of said pipeline is at least 5 miles long.

7. The method of claim 5 wherein a pressure at least one-fourth as great as the largest pressure rise occurring during application of the second and subsequent pressure pulses is maintained at said location throughout the time of application of said second and subsequent pressure pulses.

8. The method of claim 7 wherein said section of said pipeline is at least 5 miles long.

9. A method for renewing oil flow through a section of a pipeline in which oil flow has been temporarily shut off and in which quiescent oil has gelled, which method comprises
   a. injecting fluid at a location into said section while monitoring the injection flow rate until a first pipeline volume of fluid has been injected and a suitable pressure level is reached, said suitable pressure level being high enough to cause a part of said gelled oil to shear degrade thereby decreasing the flow resistance of said gelled oil;
   b. releasing at least a portion of said suitable pressure and backflowing fluid toward said location;
   c. reinjecting fluid at said location while monitoring the injection flow rate until a second pipeline volume of fluid has been injected and a second suitable pressure level is reached, said second pressure level being high enough to cause a part of said gelled oil to shear degrade thereby further decreasing the flow resistance of said gelled oil;
   d. releasing at least a portion of said second pressure and backflowing fluid toward said location;
   e. repeating steps $c$ and $d$ while progressively injecting pipeline volumes of fluid at pressures high enough to degrade the flow resistance of said gelled oil until oil flow through said section may be renewed at a continuous startup pump flow rate for a given startup pressure substantially larger than the normal continuous startup pump flow rate at said startup pressure; and
   f. renewing liquid oil flow through said section of said pipeline.

10. The method of claim 9 wherein said section of said pipeline is at least 5 miles long.

11. The method of claim 9 wherein pressure rises occur at said location during injection of fluid in steps $c$ and $e$ and a pressure at least one-fourth as great as the largest of said pressure rises is maintained at said location throughout the time of steps $b$ and $e$.

12. The method of claim 11 wherein said section of said pipeline is at least 5 miles long.

13. The method of claim 9 wherein during step $a$ the flow resistance of a first incremental portion of the gelled oil in said section is degraded, and during step $c$ the flow resistance of a second incremental portion of the gelled oil is degraded, said second incremental portion being further from said location than said first incremental portion, and during step $e$ the flow resistance of additional incremental portions of the gelled oil are degraded with each additional incremental portion being further from said location than the previously degraded incremental portions.

14. The method of claim 13 wherein said section of said pipeline is at least 5 miles long.

15. The method of claim 13 wherein pressure rises occur at said location during injection of fluid in steps $c$ and $e$ and a pressure at least one-fourth as great as the largest of said pressure rises is maintained at said location throughout the time of steps $b$ through $e$.

16. The method of claim 15 wherein said section of said pipeline is at least 5 miles long.

17. The method of claim 9 wherein the pipeline volumes of fluid injected in step $e$ are greater than the second pipeline volume of fluid injected in step $c$, and each succeeding pipeline volume of injected fluid is greater than the next preceding pipeline volume of injected fluid.

18. The method of claim 17 wherein said section of said pipeline is at least 5 miles long.

19. The method of claim 17 wherein pressure rises occur at said location during injection of fluid in steps $c$ and $e$ and a pressure at least one-fourth as great as the largest of said pressure rises is maintained at said location throughout the time of steps $b$ through $e$.

20. The method of claim 19 wherein said section of said pipeline is at least 5 miles long.

* * * * *